J. MARKUS.
SELF PROPELLED AGRICULTURAL MACHINE.
APPLICATION FILED JULY 19, 1915.

1,194,857.

Patented Aug. 15, 1916.
2 SHEETS—SHEET 1.

WITNESSES
Frank Frimmer
E. E. Jones

INVENTOR
J. MARKUS
by Srolovitz and Bogan
ATTORNEYS

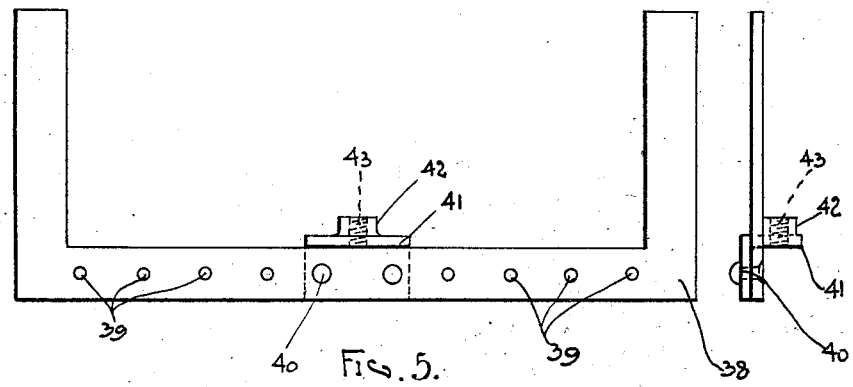
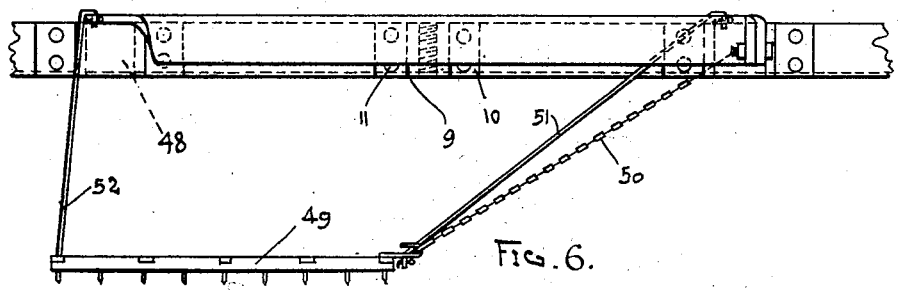
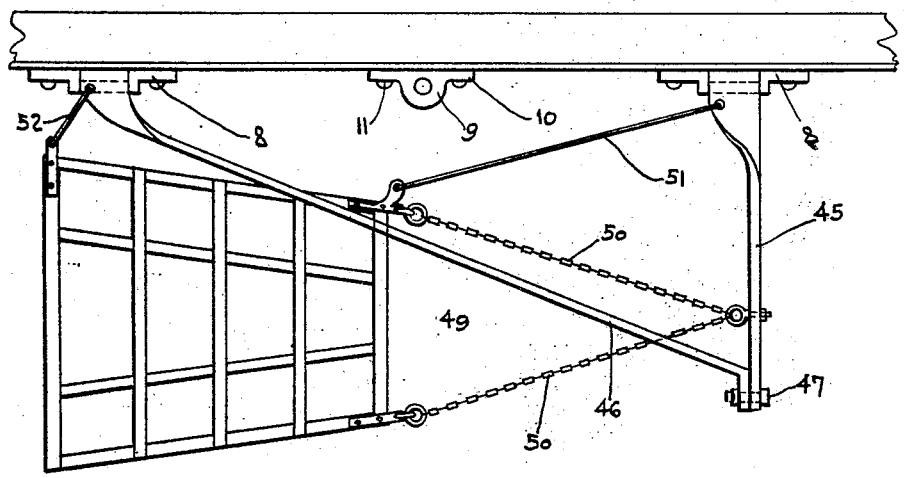

UNITED STATES PATENT OFFICE.

JOSEPF MARKUS, OF PITTSBURGH, PENNSYLVANIA.

SELF-PROPELLED AGRICULTURAL MACHINE.

1,194,857.   Specification of Letters Patent.   Patented Aug. 15, 1916.

Application filed July 19, 1915. Serial No. 40,741.

*To all whom it may concern:*

Be it known that I, JOSEPF MARKUS, a citizen of the United States of America, residing at Pittsburgh, in the county of Allegheny and State of Pennsylvania, have invented certain new and useful Improvements in Self-Propelled Agricultural Machines, of which the following is a specification.

This invention relates to self propelled agricultural machines and has for its object to provide, in a manner as hereinafter set forth, a machine of such type having its body portion carrying a motor for driving a machine and further having its body portion provided with means, in a manner as hereinafter set forth for adjustably and detachably connecting therewith a ground working implement such as a harrow, digger, or roller.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claim hereunto appended.

Figure 1:
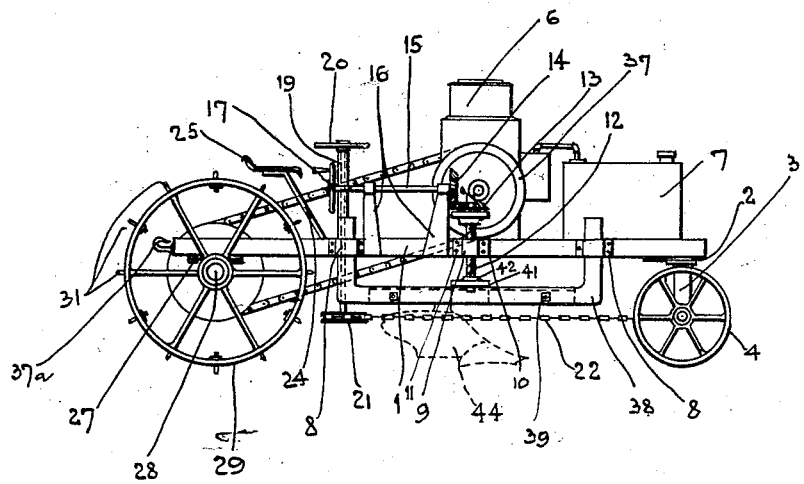
Figure 2:
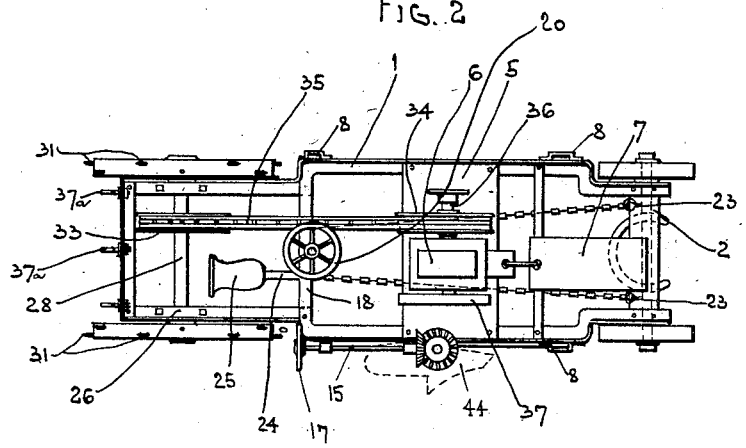

In the drawings wherein like reference characters denote corresponding parts throughout the several views: Figure 1 is a side elevation of a self propelled agricultural machine in accordance with this invention. Fig. 2 is a top plan. Fig. 3 is a side elevation. Fig. 4 is an end view of the plow share. Fig. 5 is a side elevation. Fig. 6 is a top plan, broken away, of one of the side bars of the machine body showing a harrow connected therewith.

Referring to the drawings in detail the machine body comprises a rectangular frame 1, which is contracted at its forward end as at 2 and said contracted forward end has pivotally connected therewith, an arc-shape axle 3, having mounted thereon front wheels 4.

A platform 5 is secured to the frame 1 and mounted thereon is a motor 6, preferably of an explosive type, and which has connected therewith a radiator 7 supported by the contracted forward portion 2 of the frame 1.

The frame 1 is constructed of an angle-iron bent in a rectangular manner and with the ends of the bars inset to provide the contracted portion 2 and the sides of the frame 1. The wider portion of the frame 1, near each terminus of each side, has a laterally projecting coupling member or keeper 8, for a purpose to be presently referred to.

Arranged against one side of the wider portion of the frame 1, centrally of said side, is a vertically disposed interiorly threaded collar 9, having flanges 10, through which extend hold fast devices 11, whereby said collar 9 is fixedly secured to the said side and extending through and engaging said threaded collar is a vertically disposed adjusting screw 12, having its upper end provided with a beveled gear 13 which meshes with the beveled gear 14 carried on the forward end of a longitudinally extending shaft 15, the latter being mounted in bearing brackets 16, secured to that side of the frame which has the collar 9 fixed thereto. The rear end of the shaft 15 has a hand wheel 17 for the purpose of rotating the shaft 15 when occasion so requires.

Supported by the rear end 18 of the frame 1, is a steering post 19, having its upper end provided with a hand wheel 20. The steering post extends below the frame 1 and carries on its lower end a sprocket wheel 21, which engages with a sprocket chain 22, the latter having its ends connected to the axle 2, as at 23, and by such an arrangement the machine can be steered when desired.

Supported by the rear end 18 of the frame 1 is a seat post 24 carrying a seat 25; the latter is arranged in proximity to the wheels 17, 20.

Projecting rearwardly from the end 18 of the frame 1 is a rectangular frame 26, which is of less width than the wider portion of the frame 1, and which has its lower face, at its rear end, provided with bearings 27, having rotatably mounted therein the rear axle 28, which carries traction wheels 29. Fixed to the rear axle 28 is a sprocket wheel 33, which is operatively connected with a sprocket wheel 34 by an endless chain 35. The sprocket wheel 34 is carried by a motor shaft 36; the latter is also provided with a fly wheel 37.

The rear end of the frame 26 is provided with coupling members 37ª, for adjustably connecting the ground rollers to the body of the machine.

The coupling members 8 can be employed for coupling with the machine frame a plow share attaching member, or a harrow attaching member. The plow share attaching member consists of a yoke-shape bar 38, provided with openings 39, which are employed for adjustably connecting a plow standard to the bar 38 and the vertical arms of the said yoke-shape bar extend up through a pair of coupling members 8 at one side of the wider portion of the frame 1, as illustrated in Fig. 1. The bar 38 has fixedly secured therewith, by hold fast devices 40, an angle-iron 41, formed with a vertically disposed collar 42, which is exteriorly threaded as at 43. The adjusting screw 14 is adapted to engage with the threads 43 for the purpose of vertically adjusting the bar 38 to position the plow shares 44. By arranging the bar 38 in a manner as stated the shares are positioned at one side of the machine frame.

The harrow adjusting member consists of a lateral bar 45 and an inclined bar 46, the latter having its forward end fixedly secured as at 47, to the outer end of the bar 45. The inner ends of the bars 45, 46, are bent downwardly at an angle as at 48 for the purpose of seating in a pair of coupling members 8, as clearly illustrated in Figs. 5 and 6, whereby the harrow attaching member is coupled with the machine body.

The reference character 49 denotes a harrow, which has its forward end connected with a bar 45, by flexible members 50 and furthermore has the inner corner of its forward end connected by a bar 45 and a rigid member 51. The rear inner corner of the harrow 49 is connected to the inner end of the bar 46 by a rigid member 52.

The motor shaft can be extended if desired so as to transmit power to other devices to operate them.

What I claim is:—

An agricultural machine comprising a shiftable body portion, means carried by the latter for propelling it, a pair of spaced coupling members secured to the outer face of each side of said body portion intermediate its ends, a longitudinally disposed and vertically adjustable one-piece yoke-shaped bar having its vertical arms extending through a pair of said coupling members and its longitudinal arms having a row of openings to provide for adjustably connecting plow standards therewith, and vertical adjusting means for said yoke bar, and means secured to the outer face of the longitudinal arm and projecting inwardly from the top edge of said bar and engaged by said adjusting means whereby said bar can be vertically adjusted.

In testimony whereof I affix my signature in presence of a witness.

JOSEPF MARKUS.

Witness:
E. E. JONES.